Jan. 6, 1959 W. JOHNSON 2,867,685
TELEVISION RECORDING AND REPRODUCING SYSTEM
Filed Feb. 18, 1952 7 Sheets-Sheet 4

INVENTOR.
WAYNE JOHNSON
BY
Lippincott & Smith
ATTORNEYS

Jan. 6, 1959 W. JOHNSON 2,867,685
TELEVISION RECORDING AND REPRODUCING SYSTEM
Filed Feb. 18, 1952 7 Sheets-Sheet 7

INVENTOR.
WAYNE JOHNSON
BY
ATTORNEYS

2,867,685
TELEVISION RECORDING AND REPRODUCING SYSTEM

Wayne Johnson, Los Angeles, Calif., assignor, by mesne assignments, to Minnesota Mining & Manufacturing Co., St. Paul, Minn., a corporation of Delaware Application February 18, 1952, Serial No. 272,083

17 Claims. (Cl. 178—6.6)

This invention relates to methods and apparatus for the recording and reproduction of television signals by phonographic methods. The system employed is a development of and an improvement on that disclosed in the co-pending application of John T. Mullin, Serial No. 195,612, filed November 14, 1950, and entitled System for Recording and Reproducing Television Signals now Patent No. 2,794,066, issued May 28, 1957. Primarily the most practical method of employing this system involves the use of magnetic recording, because of its economy, dynamic range and immediate reproducibility, and therefore it will be so described, but it is to be understood that there is no theoretical limitation to recordings of the magnetic type and that the same principles may be applied to other methods of recording, such as photographic.

Among the objects of the present invention are to provide a system of translating television signals into a phonographically reproducible record, or the reverse, which permits the use of a greatly reduced number of translating heads; to provide a system wherein the effect of changes of dimension in the record medium are substantially eliminated, whether such changes be due to temperature, humidity, or stress; to provide a system wherein a substantially linear relationship exists between the original and the reproduced signal; to provide a system for magnetic recording and reproduction of television signals employing a magnetically neutral or unbiased recording medium and still retain a linear over-all response, and, in general, to provide a system for recording and reproducing signals which is relatively simple and which requires a minimum of precision equipment, relative to the accuracy of the results produced, and is hence economical and commercially practical.

Television signals are characterized by the fact that, in general, they are always unidirectional; i. e., they always represent positive or zero light values, negative illumination having no meaning. Another way of stating this is that the signal that is generated always contains both a direct and an alternating component, the direct component being at least as great in magnitude as the peak value of the alternating component. A second characteristic of such signals is that the frequencies present in the alternating component thereof are too high to be satisfactorily recorded by ordinary phonographic methods using a medium traveling at commercially feasible speeds.

In accordance with the above identified application of John T. Mullin, recording and reproduction of signals of this character is accomplished by subdividing the signal; a timing wave of constant frequency is generated and recorded as a track on a suitable medium, preferably a magnetic tape. From this timing wave there are developed a plurality of secondary waves differing in phase by equal increments totalling 360 electrical degrees. The television signal is sampled instantaneously at a definite phase of each of these secondary waves to produce trains of waves, which may be sinusoidal but are preferably flat-topped pulses. The resulting samples are unidirectional pulses occurring once per cycle of each of the secondary waves. The pulses themselves are shorter than can be recorded or reproduced in their original form by the equipment used but they are extended in time, either by wave shaping networks or by the method of recording itself, so as to be reproduced as relatively flat-topped pulses, the length of which is substantially one half-period of the timing wave; a train of pulses representative of each of the sampling waves is recorded as a separate sound track.

Because of the unidirectional nature of the samples all the pulses are recorded in the same direction, in order to take advantage of the maximum dynamic range of the recording medium. Thus, in the case of magnetic recording, the recordings are made "downward from saturation," while in the case of a photographic medium all pulses are recorded as increasing exposure upon the medium. The negative half of the cycle is therefore suppressed and unused. In reproduction the pulses thus appear unidirectionally. The timing wave is reproduced simultaneously with the reproduction of the various trains of pulses and from the reproduced timing wave there are derived trains of secondary pulses of the same character as used in the sampling, i. e., as a plurality of pulses displaced in phase by equal amounts totalling 360°. The reproduced pulses are used to sample corresponding reproduced phase-displaced pulse trains and the samples from all of the reproduced trains are combined to reconstitute the original signal.

By this system the sampling of each track can take place at any time within nearly one half cycle of the timing wave, thus reducing the accuracy required of the mechanical equipment by a factor equal to the number of translating heads.

Insofar as the production and recording of the timing wave and the production of phase-displayed pulse trains are concerned, the present invention follows the teachings of the Mullin disclosure. In accordance with the present invention, however, the pulse trains developed from the timing wave are alternating the polarity and the phase displacement between the various pulse trains totals somewhat less than 180° instead of 360°. Each pulse train is applied to an individual modulator, all modulators also being supplied with the television signal which is to be recorded and reproduced. The output of each modulator is therefore a modulated pulse train having a fundamental frequency equal to the frequency of the timing wave, but the envelope of individual pulse train does not represent the over-all envelope of the television signal but an envelope representing the instantaneous values of the television wave at successive opposite phases of the timing wave. These pulses are imposed upon the recording medium, and as in the case of the Mullin disclosure, each pulse, as recorded, is of a length which will be reproduced as occupying one-half the period of the timing wave. In this case, however, each half of the recorded wave represents a sample, so that the originally unidirectional television signal appears as alternately negative and positive pulses and is so reproduced.

It will be recognized that a train of uniformly spaced pulses of alternating sign constitutes a complex wave having the same fundamental frequency as a train of unidirectional pulses which occur at the same repetition rate as, for instance, the positive pulses of the alternating train. Each type of pulse train contains, as additional components of the complex wave, strong components of high frequencies grouped about that frequency whose half-period is the pulse width, plus side-band frequencies of the order of magnitude of the fundamental frequency which arise from the differences in amplitude of the successive pulses.

The reproducing head of a magnetic reproducing apparatus, like the optical slit of a photographic reproducer, acts as a low-pass filter, the response of which falls to zero at the frequency where the effective width of the gap (or slit as the case may be) is equal to the distance the recording medium advances in one cycle.

The transducing head will therefore filter out and substantially eliminate the pulse-width frequencies, whether the pulses are alternating or unidirectional; it will pass the side-band frequencies due to modulation to the same extent that it passes the fundamental pulse-repetition frequency. But it will carry twice as much information where alternating pulses are used for sampling as it will where unidirectional pulses are used, thereby cutting in half the number of heads used to record or reproduce the same information. In either case the wave developed upon reproducing the recorded signal will have a fundamental frequency equal to the pulse repetition rate plus the side-bands due to modulation but without the high frequencies corresponding to the width of the sampling pulses.

In reproduction the produced timing wave is again used to develop a plurality of phase-displaced, alternating pulse trains substantially identical with those used in recording. Each such pulse train is introduced into a balanced modulator together with signals resulting from a corresponding record track. The pulse signals introduced into the modulator have the same fundamental frequency, plus additional frequencies due to the wave forms. These result, upon intermodulation of these two waves in a sum and a difference frequency, but as the two fundamental frequencies are the same the result is a direct current component plus a double frequency component, again with additional frequencies due to the modulation of the recorded pulses. Hence both the D.-C. component and the high frequency components are re-established in the reconstructed signal. As a result of the above procedure the number of tracks required, for a given sampling rate and record speed, is reduced by one-half, which is a very material saving. The method of recording is, of course, different; if, as is preferred, magnetic recording be used, the recording is performed upon a magnetically neutral medium, while with photographic recording it will be necessary to bias the medium to a mean light intensity. In using a magnetic medium without bias the response, as is well known, is nonlinear. Within the range of low saturation, however, the response of the medium is very nearly proportional to the square of the applied signal, and means are provided to compensate for this. There are other refinements and simplifications which become feasible with the improved system of this invention. Particularly important is the method of obtaining the phase-displaced pulse trains. The timing waves are fed to a delay line which is tapped at intervals to supply uniformly phase-displaced trains. Certain other refinements and improvements are described and claimed in concurrently filed applications which will be identified in connection with the particular features described.

Fig. 1 is a simplified block diagram of a recorder-reproducer in accordance with the present invention. In this diagram conventional equipment, such as amplifiers, buffers, and other auxiliary apparatus which would normally be included is omitted in order to make clearer the relationship of the various elements which are characteristic of the invention itself.

Figure 1:
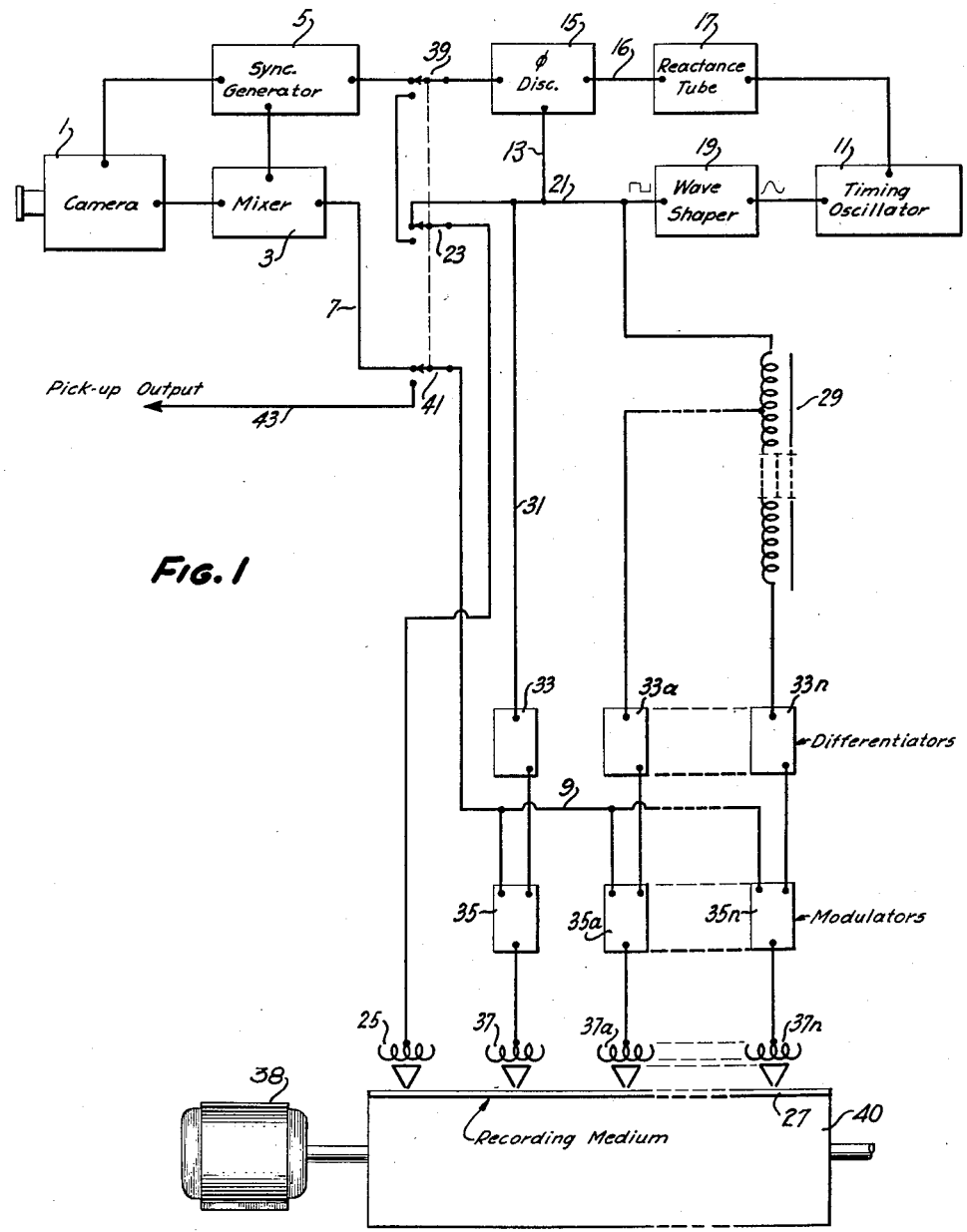
Fig. 1 is a block diagram, in simplified form, of recording and reproducing apparatus in accordance with this invention. Conventional auxiliary apparatus (e. g., amplifiers), is omitted from this figure to simplify the showing.

Considering the device first as a recorder, the television signals are picked up in the conventional manner by the camera 1 and fed to a mixer 3 where they are combined with synchronizing information developed by the sync generator 5, then passed on through circuit 7 to a common television circuit 9 feeding the recording equipment as will later be described. The recording is controlled by a stabilized timing oscillator 11. This oscillator may be of almost any conventional type, the frequency whereof can be accurately controlled. The operating frequency chosen for the oscillator depends upon a number of factors, including the number of translating heads used, the speed at which the recording medium is driven, and the frequency band which is to be reproduced. It is also desirable for various operating reasons to have the frequency of the oscillator locked in with the scanning frequencies of the system. Considering all of these factors a suitable frequency for the timing oscillator is 165,375 cycles per second. This frequency is definitely related to the present standard line-scanning frequency of 15,750 cycles, being the twenty-first harmonic of the half-line frequency. It has been determined by experiment that where magnetic tape recording is used, the recording medium being a coating of magnetic oxide upon a plastic tape, a tape speed of 100 inches per second is perfectly feasible. At this speed one cycle of the timing wave occupies a space of a little over 6/10 mil longitudinally of the tape; this is the "record wave length." Wave lengths of this order of magnitude are readily usable in magnetic recording practice.

In order to lock in the frequency of the timing oscillator 11 with the synchronizing frequency, the output of the timing oscillator is fed through a lead 13 to a phase discriminator 15, where it is compared with a frequency supplied by the sync generator 5 to develop a control voltage. This voltage is fed through a connection 16 to a reactor tube 17 which regulates the frequency of the oscillator in a manner which is well understood.

The output of the timing oscillator 11 is also fed to a wave shaper 19 which converts the normally sinusoidal output of the oscillator into a substantially rectangular wave form. This wave form is carried through a line 21 and switch 23 to a translating head 25 which records it upon the moving tape 27.

Means are provided to develop from the square waves a plurality of pulse trains of like frequency but differing in phase. Present broadcast transmission standards limit the frequencies transmitted in a video signal to four megacycles. As has been indicated above a pulse or dot is developed by each half cycle of the timing wave in each translating head. The maximum frequency developed in the reproduced signal will therefore be equal to twice the timing frequency multiplied by the number of heads used. With twelve heads the resultant maximum frequency will be 3,969 kilocycles, which is near enough the limiting 4,000 kc. to be entirely satisfactory. With ten recording heads the maximum frequency will be 3,307.5 kc., which is high enough for many purposes.

The preferred method of obtaining the phase-displaced pulse trains is to feed the square wave developed by the wave shaper 19 into a delay line 29 which is provided with taps at suitable equal intervals. The total delay of the line is dependent to a slight degree upon the number of recording heads used. Uniform phase displacements are required as between the different trains. One such train, can, of course, be derived by taking the undelayed square waves from the line 21 and supplying them to line 31. The remaining trains are supplied by the various taps, 31a, 31b, etc., connecting to the delay line. The delay at the final tap 31n at the end of the line depends upon the number of taps used. It is always a little less than 180 electrical degrees of the timing wave, being $$\frac{n-1}{n}$$

times 180°, where n is the number of taps.

Each of the lines 31, 31a, 31b, etc., connects to a differentiating network 33, 33a, such as a differentiating transformer or resistor-condenser combination, which converts the square waves into a succession of short pulses of alternating polarity. The preferred type of network is the differentiating transformer; using this method of differentiation 0.1 microsecond pulses may be produced. Each train of pulses is fed to one of the three conjugate circuits of a balanced modulator, these modulators being designated by the reference character 35 followed by a letter corresponding to that used in connection with the lead and differentiating network which feed it. Another of the circuits of the balanced modulator is supplied from lead 9, to which all of the modulators are connected in parallel. The third circuit of each modulator connects to a corresponding translating head 37, to 37n.

Many types of balanced modulators have been devised, the most convenient types being the so-called ring modulator using crystal diodes or rectifiers. Effectively these modulators are reversing switches which are effectively opened and closed by the carrier waves upon which the desired signal is to be modulated. Such switches are closed only when the carrier exceeds a certain limiting value, which should be considerably higher than the peak potential of the modulating component.

In the present instance the pulses take the place of the ordinary carrier. Since each pulse is very brief in comparison with the total length of the cycle, the electronic switches constituting each modulator are closed only instantaneously and there is a considerable lapse of time (in comparison with the duration of the closure) before the switches are operated in the opposite direction. The result is that each modulator samples the television signal at two epochs of the timing cycle, displaced in phase by 180°. As long as the input pulses are of relatively large magnitude in comparison to the instantaneous value of the television signal the magnitude of the pulses themselves has no effect upon the resulting output pulse, the latter being proportional only to the energy of the television signal at the instant of sampling. Successive samples from any individual modulator are opposite in polarity owing to the reversing switch action of the modulators and the unidirectional characteristic of the television signals which are being sampled.

As has been shown in the previously identified Mullin application, if short pulses are applied to a recording head having a magnetic gap substantially one-half of the record wave-length in dimension, the resulting magnetic recording, when picked up by a translating head of similar characteristics, will be a flat topped wave. In the present case it is assumed that the recording is done in this manner, since it permits the same translating heads to be used for both recording and reproduction, with a minimum of auxiliary equipment.

It is believed unnecessary to describe in detail the mechanism comprising a suitable motor 38 driving a capstan 40, utilized for moving the recording medium since it can take a large number of forms. Numerous such mechanisms have been devised which will progress the medium at a speed which may be maintained constant within extremely close limits. Any of such mechanisms can be used; they do not per se comprise a part of this invention.

It has been found by a construction of the recording heads described in an application of John T. Mullin, above cited, that tape one inch wide is more than ample to accommodate ten or twelve video translating heads, together with additional heads for the timing wave and accompanying sound.

What is important in connection with the recording medium is that it be magnetically neutral insofar as this can be achieved. "Tank erased" media are best, but if desired known high-frequency methods of erasure for neutralizing the medium may be employed and this is sometimes desirable where there is a question concerning what magnetic fields a tape has been exposed to following tank erasure.

When the device is to be used for reproduction, switches 23, 39 and 41 are thrown to connect the equipment for this purpose. These switches are preferably interconnected mechanically as is indicated by the dotted lines. Switch 23 disconnects the timing oscillator from the recording head and, in connection with switch 39, connects the head 25 to the phase discriminator 15. Switch 41 disconnects the common television signal circuit from the input lead 7 and transfers it to an output circuit 43, connected with the transmitter.

The tape driving means maintains the average speed of the medium at the same, precisely controlled rate at which it was recorded. At the high speed at which it is traveling the inertia of the tape itself tends to iron out high-frequency flutter, but because of possible variations in tape stretch and other more or less unforeseeable circumstances, there may be slight variations in phase of the timing wave as recorded. Its average frequency will, however, remain a constant if the proper type of drive mechanism be used, and the phase discriminator 15, in connection with the reactance tube 17, maintains the frequency of the timing oscillator in step with the average frequency of the reproduced timing wave.

Pickup heads 37 and 37n reproduce the recorded signal as flat topped pulses of alternating polarity which are fed into the modulators 35 and 35n. The circuits which, in the recording operation, were the outputs of the modulators now become input circuits, but because of the symmetrical construction of the modulators they work equally well under these circumstances. The pulse trains fed to the modulators through the delay line and the differentiating network are precisely of similar character to those used in the recording. The polarity of the pulses in the trains reverses every half cycle of the timing wave but the recorded pulses reverse simultaneously, so that the reversing switch action of the modulators serves to develop trains of unidirectional pulses, two such pulses occurring for each cycle and in each wave train. Intermodulation of the timing and recording pulses thus results in a new series of modulated pulses proportional in amplitude to the amplitude of the original sampling pulses but all in the same direction and occurring in equally spaced epochs of the timing wave cycle. These pulses are mixed in the common circuit 9 and substantially reconstruct the original signal to be fed through lead 43 to the transmitter.

Figure 2:
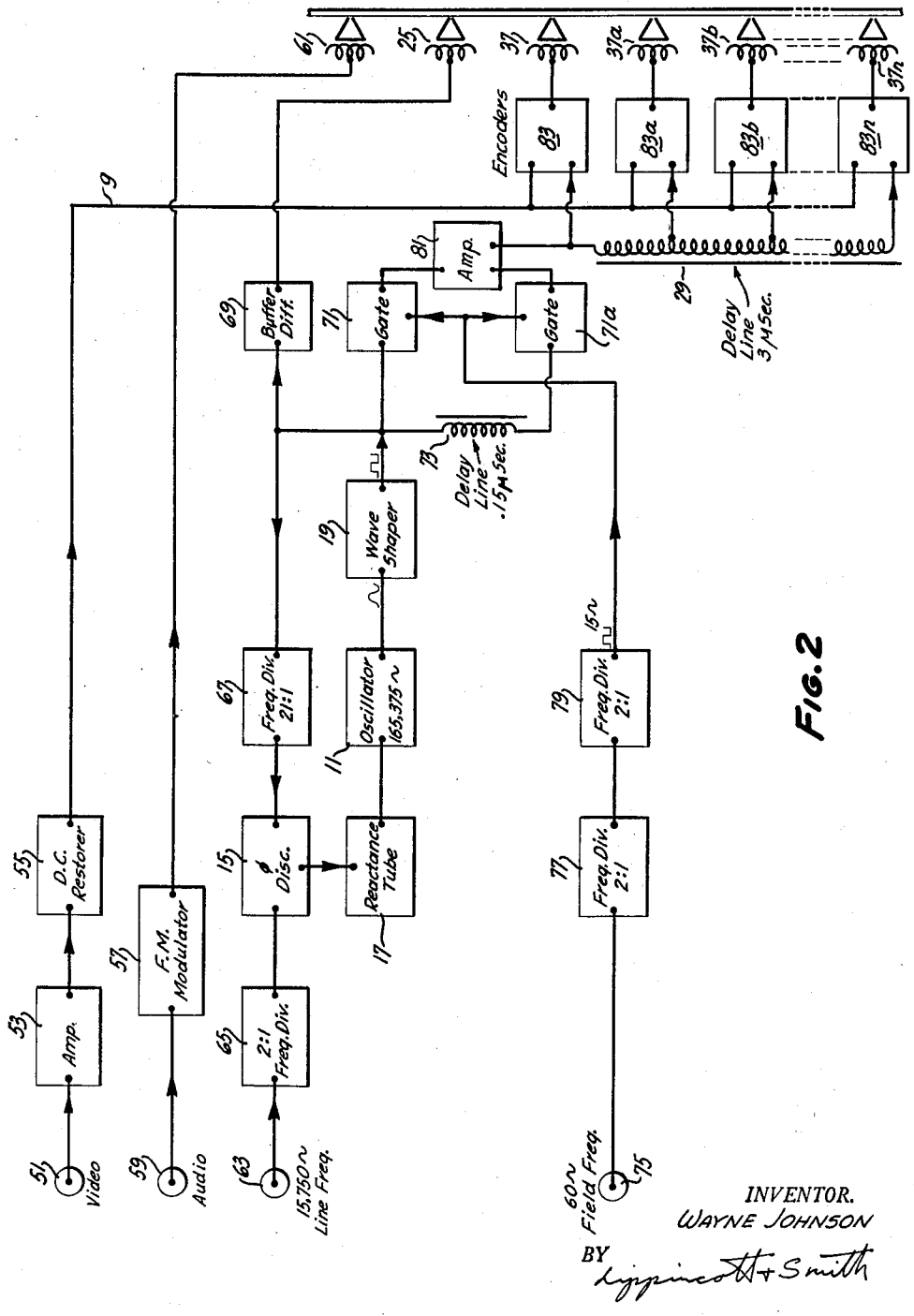
Fig. 2 is a more complete block diagram of recording equipment alone.

Fig. 2 is a more detailed block diagram illustrating the recording end only of the invention. In this diagram the parts corresponding to those shown in Fig. 1 are indicated by the same reference characters. Additional parts are shown in this diagram which were omitted in the first figure for the purpose of simplification but which, it is believed, should be illustrated for the sake of completeness.

The arrangement shown in Fig. 2 may be used for recording a received television signal as well as one derived directly from the camera. For this purpose the video signal, fed to a terminal 51 from any source, is first amplified to any necessary extent by amplifier 53 and then (in case it be a signal containing only the alternating components of the video signal) is passed through a cathode-follower D.-C. restorer 55 to the common television signal circuit 9.

Preferably the amplifier 53 is non-linear, the output being proportional to the square root of the input instead of directly proportional thereto. In the system of this invention the recording is accomplished on a medium which is not biased by either direct or high-frequency alternating current. For the low values of magnetization employed the hysteresis curve is such that the magnetic polarization left on the tape is very nearly proportional to the square of the magnetomotive force which produces it. The use of a square-root law amplifier compensates for this, and at the same time greatly diminishes the cross-talk between adjoining heads. Various square-root law amplifiers are described in chapter 19 of "Waveforms," vol. 19 Radiation Laboratory Series, McGraw-Hill, 1949.

Normally the television signal is accompanied by sound which must be accurately synchronized therewith. Therefore there is provided, together with the equipment for recording the video signal itself, apparatus for simultaneously recording the sound. This may take the form of an FM modulator 57 adapted for connection to the audio channel through a terminal 59. In the apparatus shown the mid-frequency, or carrier frequency upon which the audio signal is modulated, is chosen as 100 kilocycles and the modulator itself can be of any conventional type. The frequency modulated audio signal is fed to an ordinary recording head 61 which may be included in the same head assembly as the group of video translating heads or may be separate, since the same precision of synchronization is not required with the sound as is the case with the video signals. An error of a few microseconds in sound synchronization is entirely undetectable.

Other conventional means are employed for locking the frequency of the timing oscillator with the scanning frequency. The 15,750 cycle horizontal drive frequency is fed to terminal 63 from a standard sync generator. This frequency is fed to a scale-of-two frequency divider 65, which may be a bistable multivibrator delivering an output pulse at every alternate cycle of the input wave, feeding the phase detector or phase discriminator 15. The other input to the phase detector is derived from the 165,375 cycle timing oscillator 11 through wave shaper 19, which reforms the timing oscillator output into substantially square waves, and a scale of 21 frequency divider 67. This frequency divider can be of conventional form, comprising a scale of three and a scale of seven ring counter in tandem, which deliver output pulses at a frequency of 7,875 cycles to the phase detector or phase discriminator for comparison with the same frequency as delivered from the two-to-one divider 65. The resultant error voltage, if any, is fed to the reactance tube 17 as has already been described in connection with Fig. 1.

The rectangular pulses from the wave shaper 19 are also supplied through a buffer and a differentiating circuit 69 to the timing wave recording head 25. In connection with this particular equipment it is desirable to use identical recording heads for both the timing and the video waves. The pulses from the differentiator 69 are similar in form to those supplied to the video heads but are of constant amplitude. As will be described hereinafter these heads are slightly different in construction from those described in connection with Fig. 1. The use of the same wave form in each case is an advantage in maintaining constant phase relationship.

Also fed by the wave shaper 19 are a pair of gates 71 and 71a. Gate 71 is fed by the wave shaper directly; gate 71a receives this wave through a 0.15 microsecond delay line 73. These gates are opened and closed alternately at a 15 cycle rate, so that the timing pulses are fed undelayed through gate 71 for one complete frame of two picture fields and, in the following two fields, are delayed for 0.15 microsecond (if ten heads are used or 0.125 microsecond with twelve heads) and passed through gate 71a. The 15 cycle frequency for operating the gate is derived from the sync generator through terminal 75, which is supplied by the 60 cycle vertical drive frequency in the standard television signal. Two scale-of-two frequency dividers, 77 and 79 in tandem, serve to produce a 15 cycle rectangular wave for operating the gates.

The output circuits from both gates connect to the input of a common amplifier 81 which connects to the delay line 29.

The delay line 73 serves to delay the phase of all of the trains of timing pulses fed to the delay line by one-quarter cycle of the timing frequency or one-half of the width of each pulse of the reconstructed wave. The result is a television image of the dot-interlaced type, giving increased resolution and apparent detail to the final picture. This refinement can be omitted but is here shown because of the increasing popularity of the dot-interlaced type of transmission and to illustrate the ease and simplicity with which this feature can be incorporated in the present invention.

Figure 4:
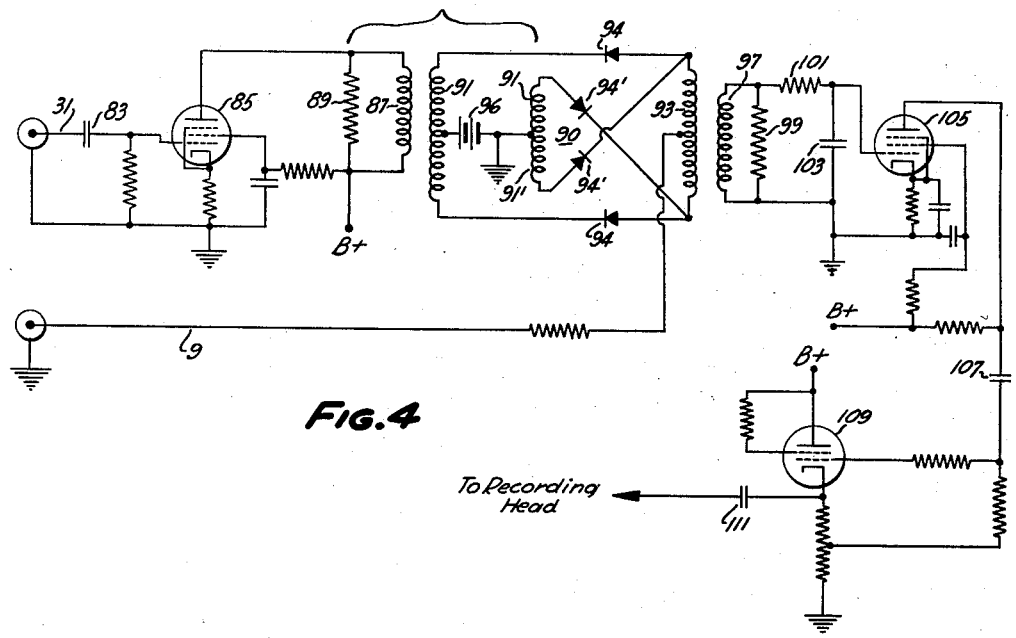
Fig. 4 is a schematic diagram of one form of encoder as used in the equipment of Fig. 2.

Fig. 2 shows the functions of the differentiating networks 33 to 33n of Fig. 1 and the modulators 35 to 35n combined in the blocks 83 to 83n inclusive. The equipment symbolized by these blocks is illustrated schematically in Fig. 4. All of these equipments are identical. The pulses supplied through the lead 31, connecting to the delay line, are passed through a blocking condenser 83 to the control grid of an amplifier 85. This is preferably a pentode, the output circuit of which connects to the primary 87 of a differentiating transformer. The primary is bridged by a damping resistor 89, and conventional circuits, which need not be described, are provided to supply suitable biases to the various electrodes of the pentode. The pentode, having a plate impedance which is very high in comparison with the impedance of the transformer primary, supplies a current wave corresponding in form to the rectangular waves applied to the grid from the delay line. The potential developed across the primary 87 is proportional to the rate-of-change of this current and since the current is changing only during the rise and fall of the square waves the result is a series of alternating pulses of a duration of approximately one-tenth microsecond.

The differentiating transformer feeds a balanced modulator generally identified by reference character 90. A conventional ring modulator may be employed, but since, during the greater portion of the cycle of operation there is no carrier potential to hold the rectifying switches "open," it is preferable to use a modified type of modulator circuit wherein no current from the modulating source can flow except when the carrier pulse is applied.

Several such circuits are known, one of the simplest is shown in the drawing. The primary coil 87 is coupled (as indicated by the bracket) to two substantially identical, center tapped secondary coils 91, 91'. The primary 93 of an output transformer is connected across the terminals of both secondaries through rectifiers, preferably germanium diodes. Each end of coil 93 connects to opposite ends of the coils 91 and 91' through oppositely poled rectifiers 94 and 94' respectively. The rectifiers connecting to each secondary coil are also oppositely poled with respect to current circulating in that secondary; e. g., both rectifiers 94 are so directed as to permit current flow only "toward" coil 91, while rectifiers 94' permit flow only "away" from coil 91'.

Video signals are supplied to the modulator from the common circuit 9 through the center taps of coils 91' and 93. The line 9 is normally a coaxial cable. The center conductor is connected to the center of coil 93; coils 91 and 91' have their center taps connected together through a source of biasing potential 96, which is grounded and hence completes the video circuit back to the grounded side of the cable.

The potential of the source 96 should at least equal the maximum potential of the video signals, and it is connected to buck the latter through rectifiers 94, which would otherwise conduct the unidirectional television signal impulses.

This modulator differs from a type which has been described in the literature only in the fact that the source 96 is grounded at one end instead of at the center tap, as would be the case if it were to be supplied by signals of alternating polarity. Its output consists of a modulated train of alternating pulses, each proportional in magnitude to the value of the video signal at the instant of its occurrence, as would be the case if the more usual type of ring modulator were employed, but by using the bias video current is prevented from flowing except at the instants when pulsing occurs and the drain on the video circuit of the parallel-connected modulators which are not momentarily active is reduced to a minimum.

Coil 93 acts as the primary of an output transformer, being coupled to a secondary coil 97. A terminating impedance 99 of 1200 ohms (in the design shown) connects across the terminals of coil 97. In parallel with resistor 99 are a resistor 101 of about 2200 ohms, in series with a condenser 103 of about 1000 mm. capacity. The control grid of a pentode amplifier 105 connects to the junction between resistor 101 and condenser 103. The purpose of this network is to integrate the pulses from the modulator, converting them into a form more suitable for recording. The length of the pulses fed to the network is, as has been indicated, about 0.1 microsecond; the integrating network delivers to the tube 105 pulses which rise very rapidly but decay at a more gradual rate, having a width at the base of from 1.5 to 2.0 microseconds. These pulses are amplified by tube 105 and fed through a blocking condenser to the grid of a cathode follower tube 109. The purpose of this tube is primarily to reduce the output impedance of the system so as to present more nearly a match to the recording head; the connections shown are conventional for this purpose.

The output circuit of tube 109 includes a blocking condenser 111, for removing any D.-C. component from the pulses supplied to the recording head and thence leads directly to the head.

In this particular recording equipment no attempt is made to record the pulses of the various pulse trains as flat topped waves, the entire effort being devoted to produce a record wherein the amplitude of the half-cycle recorded corresponds accurately to the energy in the samples, taken by the pulses, of the instantaneous values of the television signal. As will be shown hereinafter the reproducing equipment intended for use with this recorder embodies a memory device which stores energy proportional to that of the recorded pulse until it can be sampled, thus greatly extending the latitude of the sampling operation and serving the same purpose as the flat topped waves produced by such equipment as that shown in Fig. 1 when used as a recorder. Since, with such a reproducer, only the energy represented by the recording wave is important, and not the wave shape, maximum effectiveness and uniformity is obtained when the wave-forms recorded are substantially half-sine waves.

In standard recording practice the recording heads used employ a magnetic circuit which is broken at the recording point by a definite gap, even though this gap be very small. The length and uniformity of such gaps can normally be determined by introducing a shim of non-magnetic metal between the ends of the laminations which constitute the magnetic circuit of the translating heads. One well known make of recording equipment uses a shim 0.00025 inch in thickness to define the gap. Experiment with the equipment here described has shown, however, that better results are obtainable for the present purpose by using heads in which the ends of the lamination are directly abutted so that no measurable gap exists. The shape of the recorded wave, as played back, depends not only upon the length of the gap and the shape of the pulses fed to it but also upon the inductance of the recording head itself and the distributed capacity of its windings. The 165 kilocycle frequency utilized in this equipment is very nearly the upper limit of satisfactory operation, taking record speed as well as circuit constants into account. It has been found that using a butt-gap type head of low impedance and a pulse of 1.5 to 2.0 microseconds in length, optimum playback characteristics are secured. When the length of the pulses fed to the head is decreased below 1.5 microseconds the level of the recording falls off. When the length of the pulses is increased materially above from 1.5 to 2.0 microseconds the inductive inertia of the recording circuit comes into play, successive pulses begin to overlap and distortion results.

Because of the high frequencies employed, the inductance used in the recording heads can be very low in comparison with that normally used in sound recording practice and it has, in fact, been found that better results may frequently be secured by shunting the recording heads with parallel inductance and compensating for the waste of energy through this parallel inductance by additional preamplification. This increases the resonant frequency of the head circuit and reduces the "rise time" in which the current in the recording head will obtain its maximum value. With low impedance, butt-gap heads of the type here described the resulting recording becomes such as to produce, upon playback, very nearly a half-sine-wave for each pulse applied to the head, without overshoot, and of a type best adapted for reproduction with the playback equipment designed for use with it.

Figure 3:
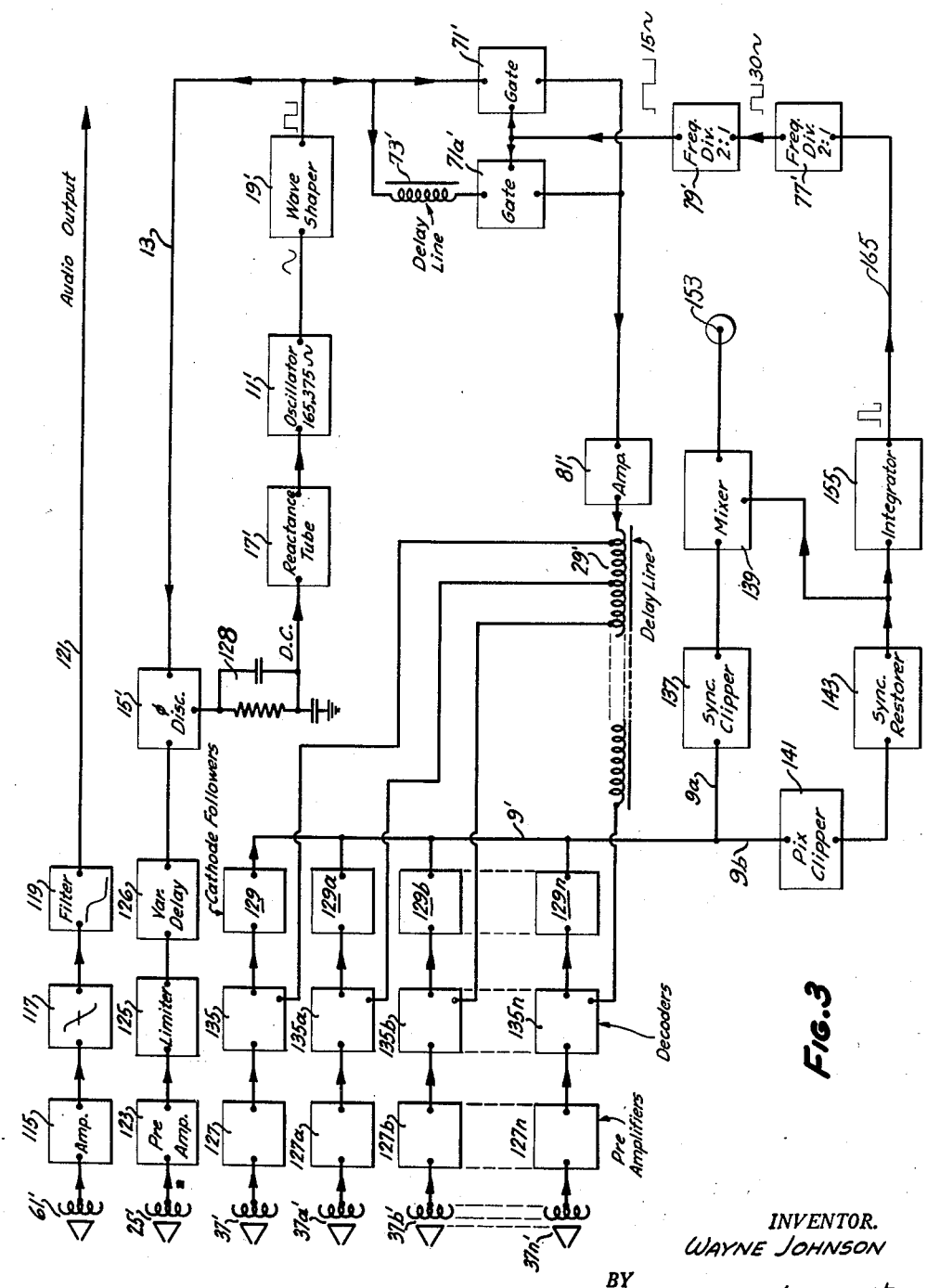
Fig. 3 is a block diagram showing reproducing or play back equipment in more complete form than in Fig. 1.

Fig. 3 is a block diagram of such playback equipment. The apparatus shown in this figure may, in part, be the identical equipment that is illustrated in Fig. 2; ordinarily such reproducing equipment is combined with the recording equipment where the latter is used, switching mechanism being employed to make such changes as are necessary between the recording and playback connections. It is, of course, also possible to embody the reproducing apparatus in entirely separate equipment for installation where no recording is contemplated.

Such parts of the equipment of Fig. 3 as are common to the recording apparatus are designated by the same reference characters as are used in the other figures, distinguished by accents. Preferably the playback heads are substantially identical in construction to the recording heads and in certain of the equipment that has been built the same heads have been used. In order to improve the effectiveness of the pickup, where, when recording, a shunting inductance has been used across the heads, such inductances are removed when used for pickup. Nevertheless, because of the high frequencies employed, it has been found better to use heads of low impedance in comparison with ordinary sound playback practice.

The sound accompanying the video signal is picked up by the translating head 61', increased in amplitude by an amplifier 115 and thence passed to a discriminator 117 which demodulates the signals and passes the audio frequency components on through a low pass filter 119 to the audio output circuit 121. Normally this output circuit will connect to the FM sound circuits of a television transmitter.

The approximately 165 kc. timing signals are picked up by translating head 25', amplified by a preamplifier 123 and thence passed to a limiter 125 before being fed to the phase discriminator 15'. A phase adjusting network 126 is included in the circuit ahead of the discriminator. Preferably this introduces a delay of at least a half-cycle of the timing wave so that the sampling pulses will normally occur at center of the interval within which a true sample can be taken. This allows the maximum latitude for mechanical inaccuracy, flutter and other factors which might introduce error. The actual sampling waves are developed, as in the case of the recording equipment, by oscillator 11'. The sine wave output of the oscillator is converted to rectangular form by wave shaper 19' and a portion of the output fed back through lead 13' to the phase discriminator 15' for comparison with the reproduced timing waves. The D.-C. error signal is smoothed out by a resistance-capacity filter 128 and thence fed to reactance tube 17' to control the oscillator frequency. The time constant of the filter circuit is such that small random variations in the phase of the reproduced timing signals will not reach the reactance tube to affect the oscillator frequency; the oscillator will therefore operate continuously at the average frequency of the timing signal, thus eliminating the effects of any "wow" or flutter on the phase-displaced pulse trains.

Square waves are also passed to gates 71' and 71a'; directly to gate 71' and through a 0.125 microsecond delay line 73' to gate 71a'. The two gates are opened alternately by 15 cycle signals developed from the 60 cycle vertical synchronizing pulses in a manner to be described below.

Square waves passing through either of the two gates are amplified by amplifier 81' and thence passed to delay line 29', which is identical in function and preferably identical in construction with delay line 29 as used in recording.

Pickup heads 37' to 37n' inclusive engage the corresponding recorded video tracks. The reproduced signals are passed through preamplifiers 127 to 127n inclusive, and thence to the balanced pulse modulators and memory circuits designated as 135 to 135n, since, although they are identical in function to modulators 35 to 35n as illustrated in Fig. 1 they differ in construction. These devices intermodulate the waves from the pickup heads with the pulses derived from the delay line, the resulting pulse trains are passed through cathode-follower buffer amplifiers 129 to 129n and thence fed to the common television signal circuit 9'.

Signals supplied to this latter circuit contain synchronizing information as well as video information, but the synchronizing information is not in the form in which it would normally be transmitted. Instead it appears as separated dots in portions of the synchronizing train where the values are not zero.

Figure 8:
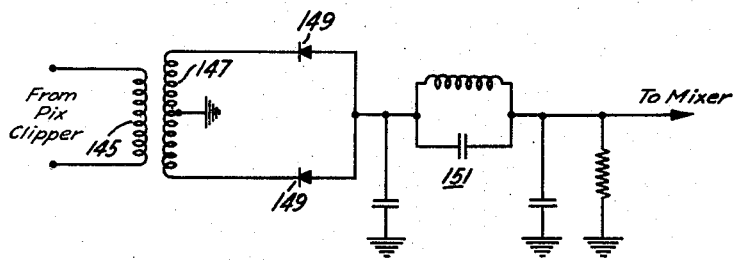
Fig. 8 is a schematic diagram of equipment for restoring synchronizing signals in a reproduced recording.

In order to restore the synchronizing information in its proper form, two branch circuits, 9a and 9b, are derived from the common circuit 9'. Circuit 9a connects to a clipper 137 which removes the base of the pulses down to the "black level" of the signals, removing all of the pedestal—that portion of the signal which is "blacker than black"—and passing only picture information on to a mixer 139. Branch 9b connects to a clipper 141 of opposite characteristics which removes from the signals everything above the black level and leaves only the synchronizing information in dot form. This information is fed to a sync restorer 143. The connections of the latter are illustrated in Fig. 8. The pulsed information is passed through a differentiating transformer having a primary 145 of too low inductance to respond to the low-frequency components of the synchronizing information and leaving only the high-frequency, 100% modulated by synchronizing pulses. The secondary 145 of the differentiating transformer connects to a full-wave rectifier comprising a pair of diodes 149 connecting to the two ends of a balanced secondary 147. The output of this circuit contains a D.-C. and a double frequency component, plus some higher-frequency components due to the non-sinusoidal form of the double frequency wave. A lowpass filter circuit, 151, of a conventional form, with a cutoff at approximately 4 megacycles, removes the high frequency components, leaving only the unidirectional impulses which are fed directly to the mixer 139 and there recombined with the video signals as they are supplied to the output terminal 153. Synchronizing information is also fed to an integrator 155. As should be apparent from what has been stated, under present transmission standards, the synchronizing information is in the form of flat topped impulses of substantially scanning line length, representing the black level, which may drop first to a slightly lower value representing the "pedestal" of the synchronizing pulses and thence to zero value, following which they rise, first to pedestal and then to full black-level value. The black level represented by the direct current which flows during most of the line may be considered as the norm, with the intervals where the current drops to zero taken as "negative" pulses superimposed upon this norm. At the end of each field a more elaborate series of synchronizing pulses is transmitted, comprising, in particular, six "negative" pulses of slightly under half line duration representing the actual field-synchronizing data. These six pulses are used, in the integrator 165, to build up a sixty cycle pulse which is transmitted through line 165 to two scale-of-two frequency dividers 77' and 79' in cascade. These develop a fifteen cycle square wave to operate gates 71' and 71a' and thus shift the phases of the sampling pulse trains to interlace the dot structure in alternate frames of the transmitted picture.

Figure 5:
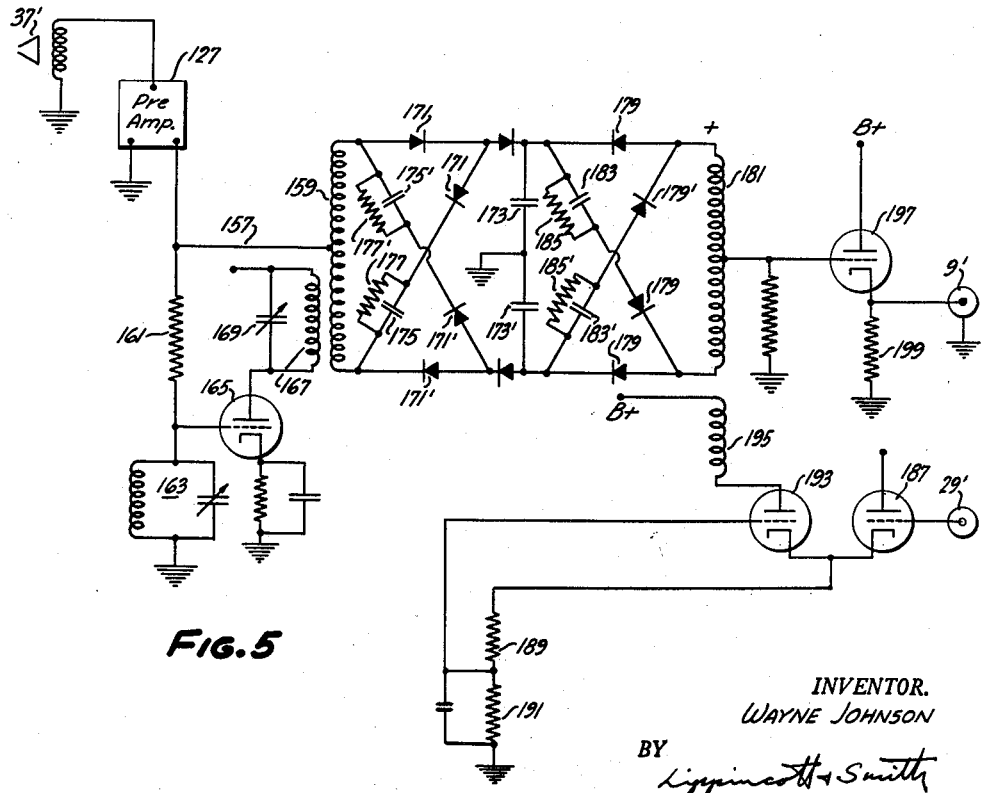
Fig. 5 is a schematic diagram of one form of decoder as used in Fig. 3.

The form of video decoder employed in the apparatus of Fig. 3 is shown schematically in Fig. 5. This shows the pickup head 37' playing into preamplifier 127. It should be noted that since the signal, as played back, results from the rate-of-change of magnetic flux in the pickup head, it corresponds to the first derivative of the intensity of the polarization produced upon the recording medium and not directly to the polarization upon the medium itself. The signal actually desired is the integral of this value, and hence the preamplifier should include an integrating circuit. Amplifiers which will integrate in this fashion are well known and hence need not be described in detail. One method of securing such integration is shown, for example, at page 650 of "Waveforms," cited above. This particular form of integrator-amplifier is fed through a resistor and a capacitive feed-back from the output back to the input is used. Highly accurate integration can be secured in this manner.

The purpose of the encoder proper is to store a potential proportional to the peak value of the recorded signal for an appreciable interval during which it may be sampled, thus reducing the precision of alinement required in the positioning of the translating heads of both the recording and reproducing mechanisms. This is accomplished by charging a condenser to a potential proportional to the peak value of the particular wave to be recorded and then using the condenser charge to modulate the sampling pulses.

It is to be noted that this storage operation is not theoretically necessary in connection with the system claimed in this application; the method and apparatus involved in its use are claimed in a concurrently filed application of the same inventor entitled System for Reproducing Recorded Television Signals, Serial Number 272,085, now Patent No. 2,695,331, issued Nov. 23, 1954. From a manufacturing and operating standpoint, however, the storage technique is so important that it is described herein to insure that the disclosed system is commercially as well as theoretically operative.

In order that the storage process may be accurately carried out precautions must be taken to insure that what is actually sampled is the value of the condenser charge itself and not a current derived directly from the pickup circuit at some other phase of the operation. To accomplish this the frequency of the recorded signal wave itself is utilized to control the condenser charging process, the video signal being applied to a diode switch which is so biased that it will pass current at only one epoch of the reproduced wave.

The signal from the preamplifier 127 is divided into two paths. The first of these paths comprises lead 157 connecting to the center tap of a secondary coil 159. This branch carries the actual reproduced signals. The second branch comprises a decoupling resistor 161 which in turn connects to one side of a high Q resonant circuit 163, tuned to the 165+ kc. frequency of the reproduced wave. Owing to the high Q of the circuit it will ring continuously with little change in amplitude, irrespective of the modulation in the recorded waves. A connection from the junction between the decoupling resistor 161 and resonant circuit 163 leads to the grid of a conventional triode amplifier 165. The anode of the amplifier tube connects to a primary coil 167, tuned by a condenser 169, to the same frequency as resonant circuit 163. Primary 167 is coupled to coil 159, to form what corresponds to the carrier input circuit of a special purpose modulator.

The two ends of coil 159 connect, through oppositely poled rectifiers 171, to one terminal of a storage or memory condenser 173, the other end of which is grounded. Both ends of coil 159 also connect through a like pair of oppositely poled rectifiers 171' with a similar condenser 173'. These are the two condensers upon which charges corresponding to the peak values of the reproduced waves are stored. It will be seen that the circuit as thus described is very similar to that of a conventional ring modulator, with the condensers 173 and 173' taking the place of the customary output coil of such a modulator. In addition, however, to the circuit elements mentioned, each of the diagonal connections of the modulator circuit has inserted therein a condenser, 175 and 175' respectively, bridged by a resistor 177, 177'. The capacity of each of these condensers is large in comparison with that of the storage condensers, and the resistors bridging them are of such value as to make the time-constant of the combination long in comparison with the approximately six microsecond period of the recorded wave.

The oscillations induced in coil 159 from coil 167 are large in amplitude in comparison with the signal potentials to be stored. Owing to the rectifying action of the diodes each of these condensers will charge to very nearly the peak value of these oscillations, applying a bias to the diodes which prevents their conducting except at the peaks. Circuits 163 and 169 are so tuned that the peaks of these oscillations occur slightly before the peaks of the modulated waves fed to the circuit through lead 157, i. e., the tuning is on the inductive side of exact resonance. Accordingly it is only during the brief epochs of the cycle, when the constant amplitude oscillations are at their peak value, and hence effectively neutralize the bias charge accumulated upon condensers 175, 175', that the diodes can conduct and the current from lead 157, dividing through the two halves of primary 159, can flow through the diodes to charge condensers 173 and 173', depending upon the polarity of the constant amplitude oscillation.

The length of the interval during which the diodes conduct can be regulated by the magnitude of bridging resistors 177, 177'. Preferably these elements have a high resistance; the higher it is the shorter will be the period of conductivity. A desirable adjustment is one wherein the bias maintained upon the condensers 175, 175' is equal to the peak value of the constant amplitude modulation minus the maximum potential to be expected from the signals fed directly from the preamplifier. The higher the constant amplitude oscillations in comparison to that of the signal waves the shorter the period of conductivity can be made. In the embodiment of Fig. 5 it is desired that this period be not greater than 60 electrical degrees, or 30° on each side of the actual peak of the control oscillation, and that conduction shall cease at the peak of the signal wave. The latter should therefore lag in phase by 30°.

The 60° charging interval is one-sixth of the timing wave period. The condensers 173 and 173' will store their charges until sampled or until the next charging interval, and since, as will next be shown, they may be sampled and discharged at any time except during the instants when they are charging, this leaves five microseconds out of the six microsecond period when the final sampling may occur.

The circuit through which the final sampling is accomplished may be substantially a mirror image of the storing circuit just described, condensers 173 and 173' acting, in this instance, as the input instead of the output of a ring modulator. Rectifiers 179 in the branches of the circuit connected from the ungrounded side of condenser 173 connect to opposite terminals of a center tapped coil 181, and rectifiers 179' are similarly connected from condenser 173'. Biasing condensers 183 and 183' are shown as connected in the diagonal arms of the modulator ring and are bridged, respectively, by resistors 185 and 185'. The square sampling pulses from the delay line 29' are applied to the grid of a triode 187, connected as a cathode follower and limiter, the cathode connecting to ground through resistors 189 and 191. The potential to ground across resistors 189 and 191 is applied to the grid of a second triode (or the second section of a dual triode) 193. A low inductance output coil 195 couples to coil 181, forming, with the latter, a differentiating transformer, which converts the square waves into alternate positive and negative pulses of approximately 0.1 microsecond duration. The amplitude of these pulses is made large in comparison with the potentials stored on condensers 173, 173'.

Resistors 185 and 185', however, are preferably made of lower value than corresponding resistors 177, 177', so as to maintain a lower bias on the diode circuit. On this output or sampling side of the circuit the bias need be maintained only of sufficient value to equal the maximum charge on the storage condensers and thus prevent its leaking off through what would otherwise be the conducting diodes connected to them. This relatively low value of bias permits the complete discharge of condensers during the very short sampling pulses.

The center tap on coil 181 connects to the grid of a cathode follower tube 197, the output of which connects the common television signal circuit 9'. Cathode resistor 199 of tube 197 may be common to all of the decoder circuits, thus serving to combine the pulses from the several tracks.

As should be apparent from what has been said in this application as well as in the Mullin application to which reference has been made, the purpose of the encoders and decoders used in the system is to extend the time during which sampling can be accomplished in the final reconstruction of the signals and thereby, within limits, nullify the effects of inevitable inaccuracies in the mechanical construction of the recording and reproducing devices. It has been found that, by the use of microscopes in assembling them, the translating heads, when limited in number to ten or twelve, may be alined to an accuracy of plus or minus 0.1 mil from a norm. At the tape speed here postulated the record-wave-length is very closely 0.6 mil, and inaccuracies in reproduction, assuming that playback is accomplished with a different set of heads than those used in recording, is plus or minus 0.2 mil or a maximum deviation from the norm of 120 electrical degrees. In time this amounts to two microseconds on either side of the norm or eight cycles of the maximum frequency in the reconstructed television signal. With the memory provided by the condensers 173, 173', the charges stored on these condensers can be converted into pulses at any portion of the cycle of the reproduced waves except that during which the condensers are being charged. As has already been stated, the charging period can be made less than 60°, or 30° on either side of the peak value of the wave applied to coil 167. This leaves periods of five microseconds during which the final modulation of the sampling pulse train from the delay line can be accomplished or 0.5 mil of track length on the recording medium. Since, with the accuracy of construction which has been postulated, the maximum deviation to be expected from one side to the other of the norm is 0.4 mil or four microseconds, the latitude provided by the decoder of Fig. 5 is sufficient to provide a high quality reproduced signal, without overlapping or confusion of the mixed pulses from the various decoders.

The degree of mechanical precision requisite for this purpose is very high and the costs of producing mechanical equipment rise rapidly as the precision requirements are increased. In producing the equipment described commercially it may therefore be found advisable to increase the latitude permitted by the equipment as thus far described.

Several expedients for this purpose are possible, each with corresponding advantages or disadvantages. One obvious method is the increase of tape speed, but this increases the bulk of the records produced and the stresses that are imposed upon the tape, with increased liability of breakage. Another method is an increase in the number of recording heads and a corresponding decrease in the timing frequency. This method is quite sharply limited because the difficulty of precise alinement increases with the number of heads and as much may be lost as is gained. A third method is electronic. With this third method the tolerances permissible in the mechanical apparatus are approximately doubled and can be increased even further; very nearly two full cycles of the timing wave are available for the final sampling, giving a total latitude of from ten to eleven microseconds or from 1 to 1.1 mils along the record track in the form next to be described and additional time for sampling can be provided in increments of the timing wave period. This additional tolerance is gained at the expense of additional electrical equipment but the expense involved may be justified in view of decreased costs of mechanical construction and maintenance.

Figure 6:
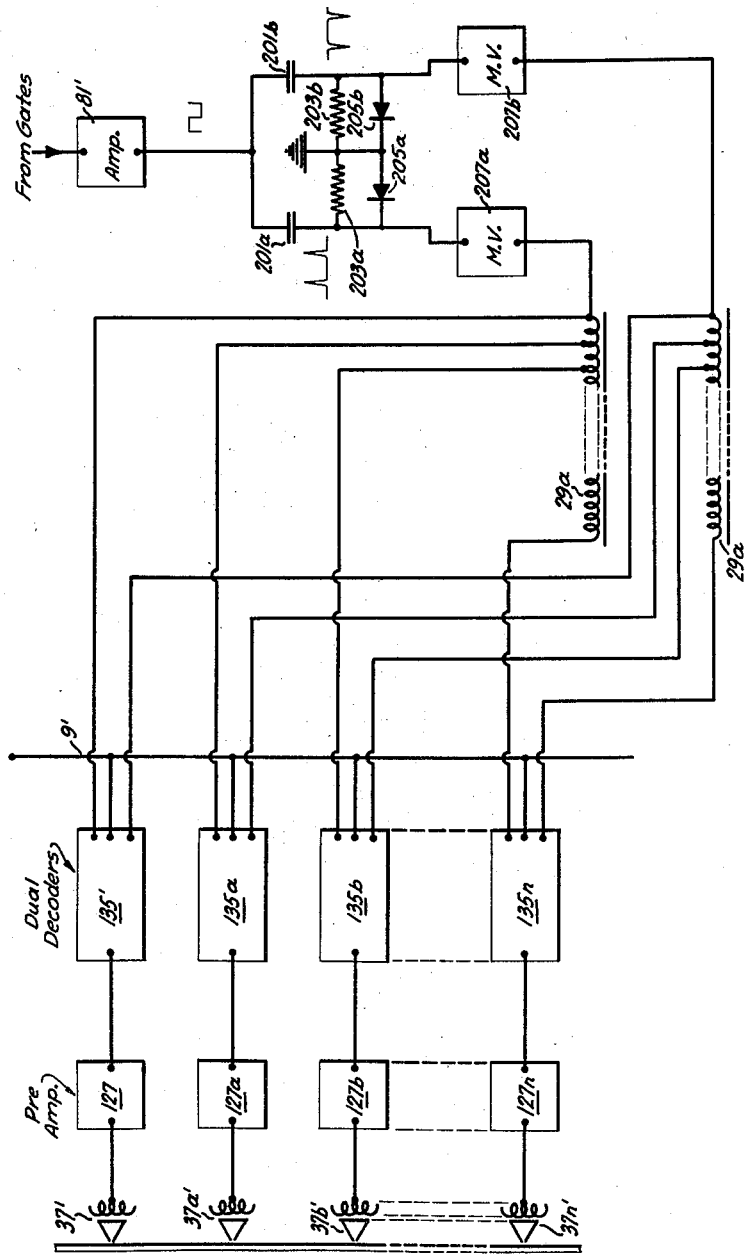
Fig. 6 is a diagram, largely in block form, of that portion of a reproducing equipment which is specifically adapted for use with dual decoders.
Figure 7:
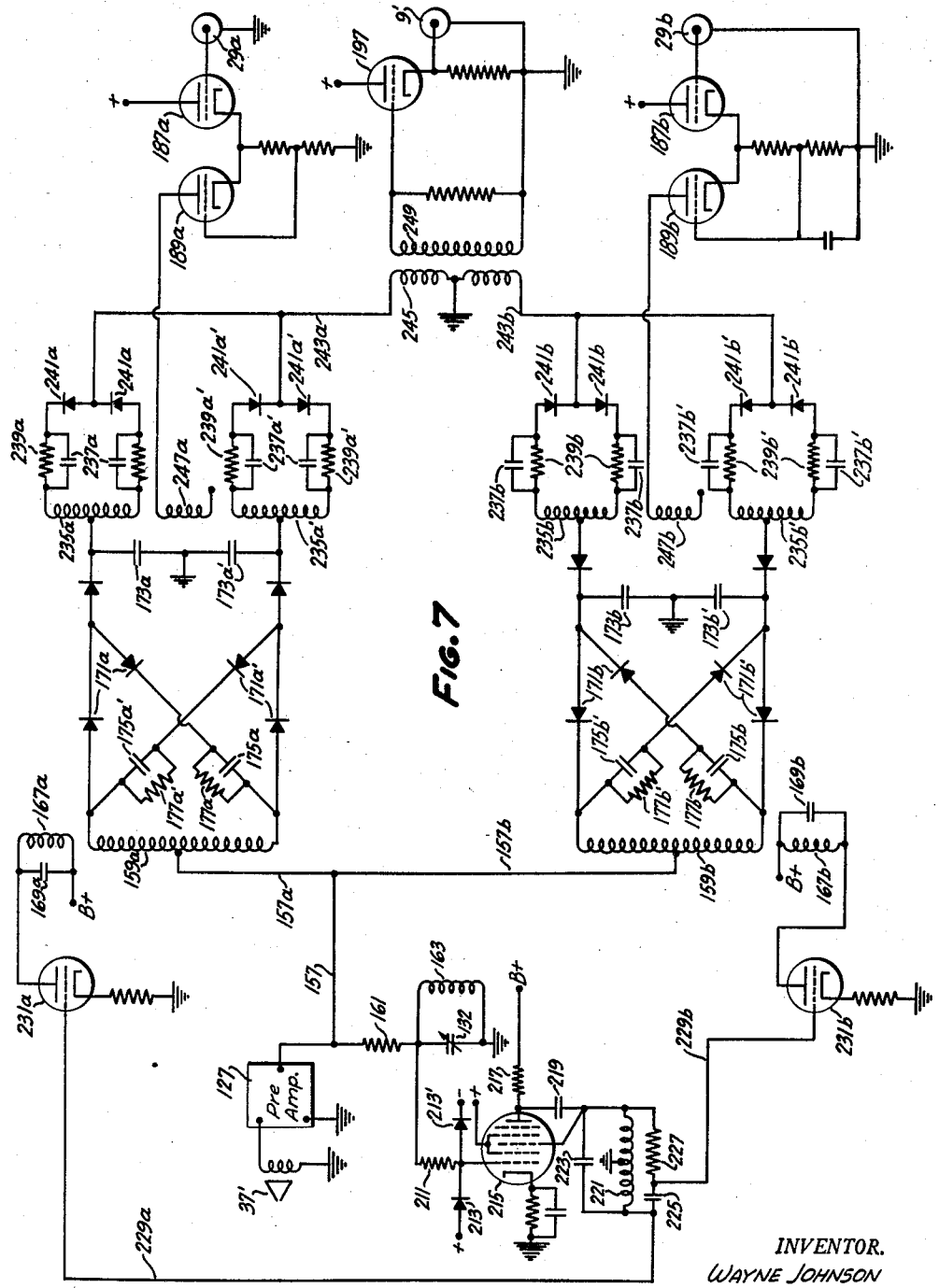
Fig. 7 is a diagram of one form of dual decoder for use as indicated in Fig. 6.

A block diagram illustrating the equipment involved is given in Fig. 6 and the details of the decoder used therewith are shown schematically in Fig. 7. In each of these figures those portions of the equipment which are identical with the parts already described in connection with Figs. 3 and 5 are omitted and only the equipment which differs from that already described is shown.

The apparatus shown in Fig. 6 is supplied with timing signals from amplifier 81' of Fig. 3 and with video signals from the pickup heads 37' to 37n', these elements being illustrated in the figure and being identical with those shown in Fig. 3.

Square waves from amplifier 81' are fed to two parallel differentiating circuits comprising, respectively, condensers 201a and 201b, connecting through resistors 203a and 203b to ground. Each of these resistors is shunted by a diode 205a, 205b the diodes being oppositely poled with respect to the grounded side of the circuit. The differentiating circuits produce, from the square waves supplied to them, pulses of alternating polarity, occurring simultaneously and in phase. Diode 205a shorts out and suppresses the negative pulses, diode 205b similarly suppresses the positive pulses. The two resulting unidirectional pulse trains are supplied, respectively, to two bistable multivibrators or flip-flop counters, 207a, 207b, adapted respectively to respond to pulses of opposite polarity. Each of these counters develops a wave train of one-half of the repetition frequency of the input pulses, or 82,137.5 cycles. Since the two output waves differ in timing by one-half cycle of their input frequency they are 90° out of phase with respect to the half frequency of 82+ kc.

The wave trains thus developed are fed to separate delay lines 29a and 29b and supply dual decoders corresponding, in function, to decoders 135 to 135n and distinguished, in the diagram, by reference characters 135' to 135n'. These decoders are connected to receive their signal information from pickup heads 37' and 37n' through preamplifiers 127 to 127n as has above been described.

One of the dual decoders is illustrated in Fig. 7. The signals from pickup head 37' and preamplifier 127 are divided, as before, between a signal lead 157 and a timing circuit comprising decoupling resistor 161 and a high Q resonant circuit 163. The signal circuit 157 is in this case, however, again divided into two branches 157a and 157b. Each branch serves to charge condensers corresponding to condensers 173 and 173' of Fig. 5, and as these circuits, up to and including the condensers mentioned, are identical with those described in connection with the latter figure, they are identified with similar reference characters followed by the postscripts a and b, respectively distinguished the two branches.

Instead of the condenser charging being controlled by the 165+ kc. timing frequency, however, they are controlled by the half-frequency of 82+ kc. This latter frequency is developed from the record on the specific track with which the equipment is associated by potentials derived from the high Q circuit 163. The frequency division for this purpose may be accomplished by various known means. In the arrangement here shown, the ungrounded side of the resonant circuit connects through a limiter, comprising a series resistor 211 shunted to ground by oppositely poled diodes 213, 213', to one grid of a hexode 215. The anode of the tube 215 is supplied from a suitable source through a resistor 217. A blocking condenser 219 connects the anode with a resonant circuit comprising a coil 221 bridged by a condenser 223. The center of coil 221 is grounded. The circuit as a whole is tuned to the 82+ kc. frequency. A second grid of the hexode 15 connects to one side of the tuned circuit. The oscillations developed in the latter alternately buck and boost the impulses from the first grid, to generate the desired half frequency. The oscillation circuit is bridged by a phase splitter, comprising a condenser 225 in series with a resistor 227. One side of the phase splitter connects through a lead 229a to an amplifier 231a; a lead 229b connects the condenser-resistor junction to the grid of an amplifier 231b. Except that they are 90° out of phase with each other these amplifiers are identical.

Tube 231a supplies the timing oscillations to a resonant circuit comprising a coil 167a in parallel with a condenser 169a, the coil 167a being coupled to coil 159a.

The only difference the performance of the storage circuit with that already described in connection with Fig. 5 is the length of the storage period. In order to store the maximum amount of energy in the storage condenser the charging period should terminate at the voltage peak of the signal waves and the charging should start when the signal waves are passing through zero. This corresponds to a 45° charging angle of the 82+ kc. wave, or 22½° on either side of the voltage maximum, and the biasing resistors 77a and 77a' should be adjusted accordingly. The phase of the control wave can be controlled by tuning condenser 169a.

The output circuits for the storage condensers as shown in this embodiment are quite different from those shown with the decoding equipment of Fig. 5 but accomplish the same purpose. The ungrounded side of condenser 173a connects through a biasing circuit comprising condensers 237a bridged by resistors 239a, the other end of both of these biasing circuits connecting to two diodes 231a in series, these diodes being poled in the same direction considered around the loop thus formed. The junction between the diodes connects to a common circuit 243a, leading to one side of a primary coil 245, the mid-point of which is grounded. Condenser 173a' connects through an exactly similar circuit to the same common lead. The "b" side of the dual decoder, i. e., the half supplied from lead 157b, is identical with the "a" side in construction, the only difference being that its charge and operation is under the control of a wave 90° out of phase.

Coils 235a and 235a' are equally coupled to a coil 247a which is supplied with square pulses from the delay line 29a in the same manner as is coil 195 as in Fig. 5. The square pulses are differentiated in coils 247a and 235a and 235a' to give the 0.1 microsecond pulses desired.

The modulated output pulses are transferred through a secondary coil 249, coupled with the common primary coil 245, to the grid of the cathode follower tube 197 which performs exactly the same function as the like numbered tube of Fig. 5.

Figure 9:
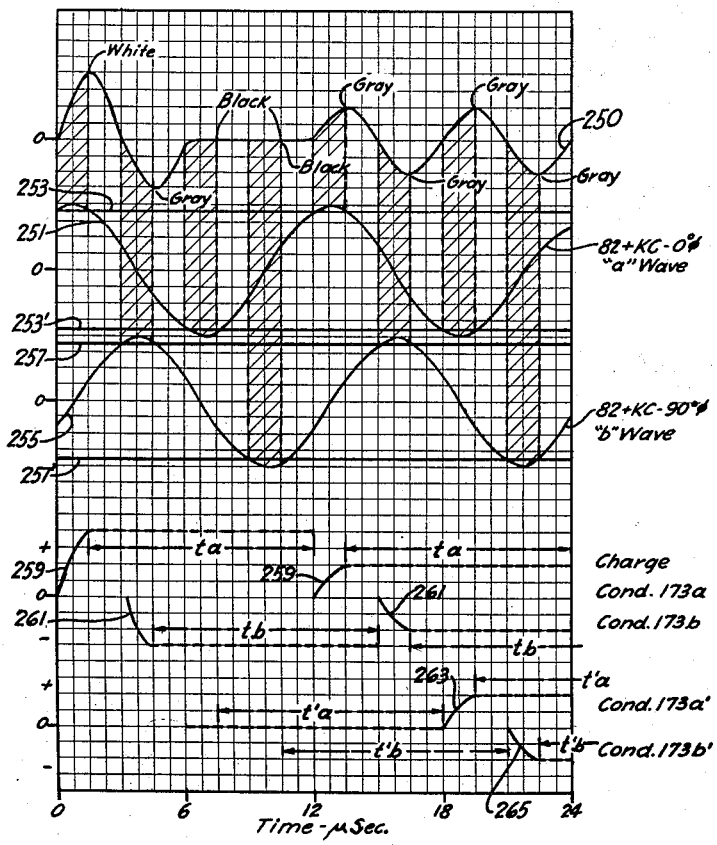
Fig. 9 is a group of curves illustrative of the phase relationships of certain waves as acted upon by the dual decoder of Fig. 7.

The phase relations of the various operations that take place in this last described form of the decoder are illustrated in Fig. 9. The upper curve, designated as 250, is intended to represent a portion of a reproduced signal as delivered from preamplifier 127. This curve represents eight samplings of the original television image, occurring within an interval of twenty-four microseconds. The samplings are assumed to have been, successively, white, light grey, black, black, followed by four equal, darker grey samples. As has been described each sample is represented by a half cycle of substantially sinusoidal form, with the exception of the black samples, which are of zero level. Actually the only signals at zero level would be the "blacker-than-black" synchronizing signals, but since such signals do occur interspersed with picture information they are illustrated to give a more diverse showing of what may happen.

Next below curve 250 is curve 251, representing the zero-phase or "a" charge-control signal. The phase of this signal is so adjusted that the peak of the curve leads the corresponding peaks of curve 250 by 22½ electrical degrees of the 251 wave. Lines 253 and 253' designate the bias levels on condensers 175a and 175a' respectively, which are adjusted so that curve 250 exceeds these levels only for a 45° interval on either side of the peak of the 251 wave. Curve 255, in like manner, represents the "b" control wave, with lines 257 and 257' representing the bias values. The dotted lines, bordering shaded areas connecting curve 250 with curves 251 and 255, indicate the conducting periods of the condenser charging modulators.

Below the curves just described are a group of partial wave forms illustrative of the charges accumulated by the various storage condensers. In each of these curves the rise from zero is represented by a solid line, which carries to the positive or negative peak and then merges with a dotted line. The instant of potential rise for each condenser is determined by one of the waves 251 or 255, but, so far as a particular channel is concerned, the instant of fall back to zero level is indeterminate. Thus waveforms 259 represent two successive charges on condenser 173a, corresponding to the first and fifth samples on wave 250. A rise occurs in the first one and one-half microseconds of the wave shown. During this 1.5 microsecond interval condenser 173a is charged to the peak value of the first half-cycle of the reproduced wave. It may be discharged any time during the ensuing 10.5 microseconds, indicated by the time interval "ta" in the curves. Wave forms 261 indicate, in like manner, successive charges on condenser 173b, as controlled by wave 255. Wave forms 263 represent charges on condensers 173a' and wave forms 265 charges on condensers 173b'. In both of the latter two curves the first cycle of the wave is zero, since the sampling occurred during a black interval. Wave 251 samples only successive positive half cycles of the reproduced wave, whereas wave 255 samples only successive negative half cycles. The positive half cycles place positive charges on the condensers, irrespective of whether the charging switches are operated by a positive or negative half cycle of the control wave whereas the negative half cycles result in negative charges upon the corresponding condensers.

The discharge cycles of condensers 173a, a', b, and b' are not shown, but it will be seen from following out the discharge circuits that the zero-phase delay line pulses always discharge a positively charged condenser, while the 90°-phase delay line pulses discharge negatively charged condensers. Since positively and negatively charged condensers discharge in opposite directions through the primary coil 245 of the output transformer, the result is the desired unidirectional signal as fed to the common output lead 9'.

The use of the dual decoders of Fig. 7 leads to much greater tolerance in mechanical construction, as has been above indicated. With a simple form of decoder, as shown in Fig. 1, where the production of an approximately square wave form of the recording medium is relied upon to produce the necessary latitude in the scanning interval, about the best that can be hoped for in the production of a flat topped wave is one which gives a period of approximately one-quarter cycle of the recorded wave, or 1.5 microseconds, in which a satisfactory sample can be taken. In the simpler storage type decoder shown in Fig. 5 the sampling time is not so definitely fixed; a compromise must be made as between condenser charging time, so as to store maximum energy, and the interval remaining for sampling. The compromise now preferred uses a 60° charging interval and 300° discharge interval; i. e., a one microsecond charging time and a five microsecond sampling time, giving a three-and-one-third fold gain in the possible sampling interval. The equipment of Fig. 5 permits the use of the optimum charging time of 90 electrical degrees and again more than doubles the possible sampling interval, giving total gain over the simplest form of seven fold, or an interval of 10.5 microseconds during which the discharge may take place, as contrasted with the one and one-half microseconds of the form illustrated in Fig. 1. This increases the permissible tolerances in the mechanical construction by nearly an order of magnitude.

It will be seen that additional latitude in sampling time can be gained, if desired, by still further sub-dividing the decoder. With what has here been disclosed it will readily be apparent to those skilled in the art that, by using a charge-control frequency of one-third or one-fourth of the original timing wave, the sampling interval can be extended to sixteen and one-half or twenty-two and one-half microseconds respectively. In any case the principle involved would be the same; the charge is stored under the control of a wave whose phase is determined solely by that at which the particular track being sampled is recorded, irrespective of the phase of that wave with relation of the primary timing wave. The sampling itself, however, is strictly under the control of the timing wave irrespective of possible relative phase shift with respect to the individual track.

The timing wave head is preferably taken as the norm or standard with which the other heads are alined. If the alinement were perfect, in both recording and playback heads the timing wave as played back would be in perfect synchronism with the wave from head 37', the waves from the other heads being delayed by successive increments with respect thereto. If the wave shaper 19' is of the simple type comprising an amplifier and a clipper, the sampling pulses would in any case be delayed by 90°, or 1.5 microseconds with respect to the wave from the pickup head; this delay may or may not be compensated by the reactance-tube-discriminator control, depending on the circuit used. Some additional delay will usually be introduced by other equipment in the timing circuit.

Taking these unavoidable delays into account, the variable delay network 126 is adjusted so that the total delay of the sampling pulse as applied to the decoder associated with head 37' is equal to one-half the interval within which sampling can be accomplished; 2.5 microsecond with the single decoder of Fig. 5, or 5.25 microseconds with the dual sampler, from the peak of the reproduced wave from the head. Note again that this assumes that by using the timing wave head as the norm in head alinement the inaccuracies in head displacement will vary statistically from this norm. If one of the other heads occupies the mean position in the alinement the delay circuit should preferably be so adjusted that the sampling pulse is supplied to the decoder associated with this head at the mid point of the sampling interval.

Usually a sufficiently accurate adjustment can be made by eye. If the sampling is occurring at the wrong epoch with respect to one or more signals a recurrent pattern will appear on the monitor screen. If there is a major phase displacement, as, for example, a 90° or 180° error as between the storage control and sampling waves, either part or all of the reproduced picture will drop out altogether or part or all will be reproduced in negative, depending on the monitor circuits.

The specific circuits shown for the individual elements of the apparatus described herein are merely illustrative. Many types of balanced modulators have been devised, for example, some using vacuum tubes, others using contact rectifiers of many different varieties. Practically any one of these modulators can be substituted for those shown in connection with this specification. The number of pickup heads, the frequencies employed, and other specific details are those now believed to have advantages in connection with present standards of television transmission but they are not fundamental to the invention as such. Such matters of detail, as described herein, are not intended to limit the scope of the invention, which it is desired to cover as broadly as defined in the following claims.

I claim:

1. Apparatus for phonographically translating television signals comprising multiple head means for simultaneously recording a plurality of electrical waves as parallel phonographic tracks, a timing wave generator of substantially constant frequency, means for deriving from said timing wave alternating pulses short in comparison with the period of said timing wave, a plurality of balanced modulators each having one output and two input circuits, a connection from the output circuit of each of said modulators to an individual head of said recording means, means for supplying the signals to be recorded to one input circuit of each of said modulators, and means for supplying to the second input circuit of each of said modulators said alternating pulses in different phases.

2. Apparatus in accordance with claim 1 wherein said last mentioned means comprises a delay line connected to said pulse deriving means and equally spaced taps connected from said delay line to said input circuits of the respective modulators.

3. Apparatus in accordance with claim 1 including connections from said timing wave generator to an additional head on said recording means.

4. Apparatus for translating television signals into phonographically reproducible recordings or vice versa comprising a plurality of translating heads, a plurality of balanced modulators each having one circuit connected to a respective one of said heads, a pulse input circuit and a signal circuit; a common television signal circuit connected to the signal circuits of all of said modulators, means for generating a timing wave, means for deriving from said timing wave trains of pulses of alternating polarity, and means for supplying said pulses to the pulse circuits of each of said modulators in different phase.

5. Apparatus in accordance with claim 4 wherein said last mentioned means comprises a tapped delay line.

6. Apparatus in accordance with claim 4 wherein the frequency of said oscillator is at least one order of magnitude lower than the highest frequency to be passed by said common television signal circuit.

7. Apparatus in accordance with claim 4 for recording television signals comprising an additional translating head connected to said timing generator.

8. Phonographic type apparatus for recording or reproducing television signals comprising the combination, with means for progressing a recording medium at a substantially constant speed, of a plurality of translating heads positioned to trace parallel tracks along the moving medium, means for generating a timing wave of substantially constant frequency materially lower than the highest frequency components in the signals to be reproduced, means for deriving from said timing wave a plurality of displaced trains of pulses of alternating polarity, the pulses of each train having a repetition period integrally related to the period of said timing wave and the duration of each pulse being short in comparison to said repetition period, a plurality of balanced modulators each having one output and two input circuits, connections for supplying one input circuit of each of said modulators with a different one of said pulse trains, connections from the output circuit, of each of said modulators to an individual one of said heads, and connections from the other output circuit of each of said modulators to a common signal circuit.

9. Recording apparatus in accordance with claim 8 wherein said translating heads are of the magnetic type, and including in said common signal circuit means for modifying input signals supplied thereto to pass to said modulators signals the relative amplitudes whereof are substantially proportional to the square roots of the amplitudes of the corresponding signals as supplied to said modifying means.

10. Recording apparatus in accordance with claim 9 wherein said modifying means comprises a square-root law amplifier.

11. Apparatus in accordance with claim 8 including an additional translating head and means for supplying said additional head with waves of constant amplitude at said timing wave frequency.

12. Reproducing apparatus in accordance with claim 8 including integrating means interposed in the connection between each of said heads and said modulators.

13. Apparatus in accordance with claim 12 wherein said integrating means comprises a pre-amplifier.

14. Phonographic-type recording apparatus for television signals comprising a common input circuit and a plurality of circuits derived therefrom, means in each of said derived circuits for periodically sampling signals supplied to said common circuit at intervals long in comparison with the duration of each sampling, means for producing from successive samples in each of said derived circuits pulses of opposite polarity, means for controlling the instants of sampling in each of said derived circuits to produce cyclically therein a continuous succession of substantially equally spaced pulses, and means for recording on a phonographic-type medium separate record tracks each representative of the sample pulses in a corresponding one of said derived circuits.

15. Apparatus in accordance with claim 14 including means interposed in said derived circuits, ahead of said recording means, for lengthening each pulse to a period of the order of magnitude of the intervals between the samplings in the derived circuit wherein said means is connected.

16. In combination with apparatus for reproducing television signals, including interspersed video and synchronizing information, from recordings on a phonographic-type medium wherein such signals are reproduced as pulses recurring at the highest frequency to be reproduced, and wherein said synchronizing information comprises pulses of an amplitude not exceeding an arbitrary black level limit and said video information comprises pulses of an amplitude equal to or exceeding said limit, means for converting said synchronizing information into form suitable for transmission comprising a common input circuit for interspersed video and synchronizing pulses, a synchronizing information circuit derived from said input circuit, means in said synchronizing information circuit for limiting the amplitude of signals therein to said black level, means for rectifying said limited signals to produce unidirectional currents corresponding in magnitude to the amplitude thereof, means for filtering from said unidirectional currents pulsations of said highest reproduced frequency; a video circuit also derived from said common circuit, means for reducing the amplitude of pulses in said video circuit by a constant quantity proportional to said black level, and means for recombining the signals from both of said derived circuits.

17. In combination with apparatus for reproducing television signals, including interspersed video and synchronizing information, from recordings on a phonographic-type medium wherein such signals are reproduced as pulses recurring at the highest frequency to be reproduced, and wherein said synchronizing information comprises pulses of an amplitude not exceeding an arbitrary black level limit and said video information comprises pulses of an amplitude equal to or exceeding said limit, means for converting said synchronizing information into form suitable for transmission comprising a common input circuit for interspersed video and synchronizing pulses, a synchronizing information circuit derived from said input circuit, a clipper connected in said derived circuit for limiting the amplitude of pulses passed thereby to said black level, a full wave rectifier connected to receive pulses from said clipper, a filter having a cut-off at least as high as said highest reproduced frequency and lower than twice said frequency connected to the output of said rectifier; a video circuit also connected to said common circuit, a clipper in said video circuit for removing from signals passed thereby pulses of less than black-level amplitude, and a mixer connected to recombining the outputs of said filter and said last mentioned clipper.

References Cited in the file of this patent

UNITED STATES PATENTS

| | | |
|---|---|---|
| 1,771,360 | Thurm | July 22, 1930 |
| 1,867,542 | Hammond | July 12, 1932 |
| 1,974,911 | Beucker | Sept. 25, 1934 |
| 2,313,915 | Bedford | Mar. 16, 1943 |
| 2,347,084 | Cooney | Apr. 12, 1944 |
| 2,427,421 | Rieber | Sept. 16, 1947 |
| 2,517,808 | Sziklai | Aug. 8, 1950 |
| 2,548,795 | Houghton | Apr. 10, 1951 |
| 2,629,017 | Dahlbom et al. | Feb. 17, 1953 |
| 2,698,875 | Greenwood | Jan. 4, 1955 |

FOREIGN PATENTS

| | | |
|---|---|---|
| 832,168 | France | June 27, 1938 |